United States Patent Office 2,763,555
Patented Sept. 18, 1956

2,763,555

PROCESS OF PRODUCING MODIFIED LARD

Frank A. Norris and Karl F. Mattil, Chicago, Ill., assignors to Swift & Company, Chicago, Ill., a corporation of Illinois No Drawing. Application January 9, 1953,
Serial No. 330,586

3 Claims. (Cl. 99—118)

The present invention relates to the treatment of lard, and more particularly to the production of lard and lard-containing products having improved properties.

Lard, commercially the most important triglyceride material from an animal source, is fat obtained from the fatty tissue of hogs by a heat, solvent or enzyme treatment of the fatty tissue. The most common method of obtaining lard from the fatty tissue of hogs is the so-called wet or steam rendering treatment in which the fat is separated from the tissue by means of pressure with hot water or steam to give what is known as prime steam lard. Another common method of obtaining lard is by the dry rendering process in which fat is removed from the fatty tissue by means of heat alone. The latter method of obtaining lard includes the kettle rendering process in which the fat is melted in a hot water or a steam jacketed kettle. Other methods of obtaining lard, such as solvent and enzymatic treatment of fatty animal tissue, while not widely used on a commercial scale are potentially important sources of lard.

After recovering the lard from the fatty tissue, the lard is generally treated to impart certain desired characteristics thereto. Thus, the lard may be settled, bleached, refined, washed, filtered, and deodorized to yield a substantially odorless and tastelsss product.

Lard is often further treated to impart thereto the desired degree of plasticity, as when the lard is to be used in baked products. This desired plasticity may be obtained by a process which includes compounding therewith hardened lard or a hydrogenated vegetable fat, incorporating air therein and chilling. Of particular importance in the texturizing process is the chilling step. This chilling of the lard may be accomplished by means of chill rolls or an internal chilling machine. In the former method molten fat is picked up on the surface of the internally chilled rotating rolls and then subsequently scraped therefrom and further worked to give the lard a uniform plastic consistency. Chilling by means of an internal chilling machine is accomplished by passing molten fat through a series of vertical or horizontal units where the fat is supercooled and allowed to solidify while being rapidly worked. The lard product treated in the foregoing manner is generally employed as a shortening. Heretofore the plasticity of the final product has depended to a great extent on the nature of the foregoing chilling operation, and the final plasticity has been highly sensitive to the conditions of the chilling step. For this reason the operating conditions in the chilling step have necessarily been critical and required very careful control.

Another important characteristic of a shortening is its creaming ability. This creaming ability is a measure of the amount of air that can be incorporated into a batter during the mixing operation. The greater the amount of air absorbed and retained by the fat, the greater the leavening effect of the shortening. Thus, for example, the volume of a cake may be increased by the use of shortening possessing superior creaming properties. The creaming ability of a shortening may be determined by measuring the density of the batter or dough, or by measuring the volume of a cake in which the shortening has been incorporated. A high specific gravity indicates a relatively dense mass with only a small amount of incorporated air, while a low specific gravity indicates a light, fluffy mass having a large amount of air incorporated therein. In general, the value of a shortening increases with its ability to absorb air.

Still another very important characteristic of a shortening is its appearance, particularly after being held at the elevated temperatures frequently encountered during distribution and sale of the product. Solidified animal triglyceride material such as lard and lard-containing products frequently have a dull, waxy, and Vaseline-like appearance which becomes progressively more pronounced the longer the product is held. The appearance of lard and lard-containing products is generally considered much inferior to the appearance of vegetable shortenings which have been held under comparable storage conditions, since vegetable shortenings possess a smooth, satiny luster which is retained even after prolonged storage.

While lard has unsurpassed shortening properties, the vegetable shortenings are generally considered to have superior creaming and emulsifying properties as well as improved appearance and storing properties. One of the principal causes for the inferiority of the appearance, storing properties, creaming ability, and emulsifying properties of the lard is the needle-like crystal formation which the lard glyceride molecules assume upon solidifying and which continue to grow during storage. The long, needle-like crystals impart to lard and lard-containing products the waxy, rubber-like texture or graininess which becomes much more pronounced and highly objectionable on standing at the relatively high temperatures generally encountered when distributing through normal commercial channels. Although it has been found possible to temporarily alter the crystallization pattern of lard by packaging while holding the lard at a carefully controlled, relatively low temperature, the lard crystals soon revert to their natural long, needle-like form when the lard is allowed to stand at room temperature. For this reason the foregoing temperature treatment during the packaging of lard is of no practical value when applied to lard which is to be distributed through normal commercial channels.

In order to overcome the foregoing objectionable properties of lard and lard-containing products which have been found to be attributable to the normal crystallization habit of lard, it is an essential object of the present invention to permanently alter the normal crystallization habit of lard so as to prevent the formation of large, needle-like crystals during crystallization and subsequent storage.

Another object of the present invention is to provide a method wherein lard is treated with a catalyst under suitable conditions of temperature, pressure and time as to permanently alter the normal crystallization habit of such lard.

An additional object within the broad scope of the invention is to provide lard in which the heat of crystallization normally associated with the glyceride molecule is substantially altered.

Another object of the invention is to provide a product containing lard having improved plastic properties, including improved pliability and workability.

An additional object of the invention is to provide a lard product having improved appearance characterized by a smooth velvety sheen.

A further object of the invention is to provide a lard product having properties which equal or excel those of vegetable shortening while maintaining the superior shortening characteristic of lard.

Still another object of the invention is to provide a lard product having improved baking qualities, including enhanced emulsifying and creaming properties.

A still further object of the invention is to provide a satisfactory lard product which may be texturized with a greater degree of flexibility in the operating conditions.

An additional object of the invention is to provide a shortening product containing as its predominating ingredient a partially hydrogenated lard which has been modified in accordance with the present method.

Still further objects of the invention will be apparent from the following description and claims.

In accordance with the present invention it is proposed to subject lard to a heat treatment in the presence of a substance capable of changing the crystallization properties thereof under conditions which do not cause an appreciable change in the melting point of the glyceride material. The reaction which modifies the triglyceride molecules is highly complex and the mechanism is not completely understood. It has been observed, however, that the crystal habit and the heat of crystallization of the triglyceride molecules of lard are very significantly affected. And, since the substances capable of modifying the crystallization properties of triglyceride molecules do not become part of the crystal modified triglyceride molecules, the reaction appears to be catalytic. Therefore, the effective substances are herein referred to as crystal modifying catalysts.

Without limiting the invention to any particular theory or mechanism, it is believed that a more complete understanding of the present invention and of the lard crystal modification reaction will be obtained by considering the reaction mechanism which appears to be supported by the experimental evidence. As only the higher melting point components of lard are crystalline at temperatures of about 68° F. and above, only these higher melting components are believed significant when studying the mechanism which produces the change in the X-ray diffraction pattern of lard and the changes in physical properties coincident therewith. Thus, the trisaturated and disaturated lard triglyceride molecules are considered of primary importance. As reported in the literature and as determined by experimental work, the major proportion (86 per cent) of the normal crystalline components of natural lard consists of monounsaturated-disaturated triglycerides, for example, beta-oleo-palmitostearin, and in their natural state are symmetrical with regard to the unsaturated component (Hildich, The Chemical Composition of Natural Fats, 1941 edition, p. 248, ibid.). It has also repeatedly been reported in the literature that these symmetrical monounsaturated-disaturated triglycerides, such as beta-oleo-palmitostearin, form beta-type crystals as their most stable and normal form. However, the normal and stable form of these monounsaturated-disaturated triglycerides having their unsaturated acid groups in a position other than the beta position and thereby having an unsymmetrical configuration with respect to the unsaturated acid, is the beta prime crystal form, the normal crystal form of hydrogenated vegetable oil shortening. Thus, it has been found that when the higher melting point fraction of a triglyceride material is comprised of a major proportion of symmetrical beta-forming triglycerides, such as beta-oleo-palmitostearin, the material will crystallize in the beta form, whereas when this triglyceride material has a major proportion of its higher melting point constituents in the unsymmetrical form the material will crystallize in the beta prime form, the normal crystal form of hydrogenated vegetable oil shortening, and assumes the appearance and desirable properties associated with hydrogenated vegetable oil shortening. It is therefore believed that the crystal modification of lard is obtained as a result of transforming and isomerizing the naturally occurring symmetrical monounsaturated-disaturated lard triglycerides which comprise the major proportion of the higher melting point constituents of lard into the unsymmetrical isomers which have as their most stable form the beta prime crystal form. The foregoing has been supported by the observations that when lard is treated in accordance with the hereindisclosed crystal modification process that there is no appreciable change in the percentage of monounsaturated-disaturated triglycerides of lard as a result of the crystal modification treatment (e. g., 26.4 per cent before modification and 26.8 per cent after modification).

Heretofore when a liquefied glyceride fatty material has been treated with certain catalytic agents, the conditions which have been employed cause a molecular redistribution of the fatty acid groups between the triglyceride molecules and result in a change in the composition of the glyceride molecules. This redistribution has been termed interesterification or transesterification. The final result of the interesterification is a random distribution of the fatty acid molecules among the glyceride molecules. The interesterification is evidenced by an appreciable change in the melting point of the treated product and in the quantity of the triglyceride material which crystallizes from a solvent for the glyceride product at a specific temperature. For example, when cottonseed oil is interesterified with any of the recognized interesterification catalysts and under conditions employed heretofore, the melting point and the proportions of the several glyceride molecules in the glyceride material are significantly altered.

In marked contrast with the previous method of catalytically treating triglyceride material, the herein-disclosed crystal modifying treatment does not appear to cause an appreciable change in the melting point of the material, a change in the chemical composition and structure of the fatty acid groups of the glyceride molecules, nor an appreciable change in the proportions of the several types of glyceride molecules in the material being treated. There appears to be no significant amount of interesterification of the glyceride molecules under the conditions employed in the present invention, as measured by the increase of trisaturated glycerides, although a small degree of interesterification has been observed to occur during the crystal modifying treatments and to continue after crystal modification has been completed.

More particularly the present invention contemplates heating lard at relatively moderate temperatures above the melting point of the highest melting point components of said lard in the presence of a crystal modifying catalyst for a period sufficient to substantially alter the normal crystallization habits of the triglyceride molecules but apparently without causing any significant amount of interesterification of triglyceride molecules.

It has been found that a number of catalysts are effective in accomplishing the purpose of the present invention. Many organic and inorganic salts which have been successfully employed to crystal modify lard are the halides, hydroxides, and sulfates of tin; the halides, oxides, hydroxides, and acetates of zinc; the oxides, carbonates, acetates, and nitrates of lead; halides, carbonates, hydroxides, and sulfates of iron; and inorganic salts of antimony, cadmium, nickel, mercury, bismuth, aluminum, magnesium, and titanium. Examples of specific inorganic salts which have been successfully employed to crystal modify lard are stannous chloride, stannous hydroxide, stannous sulfate, stannic sulfate, and stannic chloride, zinc acetate, zinc chloride, zinc hydroxide, zinc oxide, zinc peroxide, zinc iodide, lead dioxide, lead carbonate, lead acetate, lead nitrate, red lead oxide, cobaltous chloride, cobaltous nitrate, cobaltous hydroxide, cobaltous acetate, cobaltic acetate, cobaltic nitrate, ferrous carbonate, ferrous hydroxide, iron subsulfate, ferric chloride, antimony trichloride, cadmium oxide, nickel sulfate, mercuric bromide, aluminum chloride, aluminum stearate, bismuth nitrate, magnesium nitride, and titanium tetrachloride. Other inorganic salts within the classes illustrated and suggested by the foregoing compositions may likewise be employed as catalysts in the present invention.

The effective amount of the foregoing polyvalent metal salts may range from about 0.01 per cent to about 3.0 per cent and higher and preferably between about 0.1 per cent and 2.0 per cent, based on the weight of the fat which it is desired to modify. The catalyst may be added in dry form, in the form of solution, suspension, or by means of a solid carrier, such as kieselguhr. The catalyst may also be added in the form of a saturated solution or slurry, or as a dilute solution, the amount to be added being calculated on the dry weight thereof. It is not desirable to add the crystal modifying catalyst in too dilute a form, however, since large dilutions entail the removal of a greater amount of the solvent.

The most desirable concentration of any particular catalyst varies somewhat from catalyst to catalyst, depending largely on the activity of the particular catalyst chosen. In addition to variations due to the activity of the particular catalyst, the optimum concentration of catalyst also depends somewhat upon the condition of the fatty material being treated. For example, when a catalyst such as stannous chloride or stannous hydroxide is employed, it has been observed that a lard having a high peroxide value requires a larger amount of catalyst to completely crystal modify than a lard which has a low peroxide value. It has also been observed that the peroxide value of a lard decreases appreciably when treated with a hydroxide catalyst such as stannous hydroxide. Thus, for example, when the lard to be modified has an initial peroxide value of 60, it has been found desirable to increase the concentration of stannous hydroxide to about 1.0 per cent, whereas the same lard having a peroxide value of around two or three requires only 0.2 per cent catalyst to crystal modify. Similar results have been observed when other catalysts, such as hydrated stannous chloride, are employed as the catalyst. It is therefore desirable to employ a lard having a relatively low peroxide value. It has likewise been found desriable to remove a large part of moisture initially present in the rendered lard before crystal modifying with the herein-disclosed catalysts.

The time of treatment required to crystal modify lard varies between about 30 minutes and 6 hours, and preferably between about 1 hour and 5 hours. The optimum time of treatment required to produce crystal modified lard varies with the temperature, concentration of catalyst employed, and upon the condition of the triglyceride material being treated. Within the effective temperature range it can generally be said that at the lower temperature the speed of reaction is slower. When the concentration of catalyst is reduced below the optimum value, more time is required to complete the crystal modifying reaction. For example, treating lard with .07 per cent stannous hydroxide at a temperature of about 200° C. produces the same significant degree of crystal modification in 5 hours as 0.2 per cent stannous hydroxide employed at the same temperature produces in one hour. Likewise, it has been found that more time is required to complete crystal modification when the lard has been allowed to stand for prolonged periods after rendering and before commencing the crystal modifying treatment. It is therefore desirable to employ a good quality, freshly rendered lard.

The temperature at which crystal modification is effected with the hereinabove-disclosed crystal modifying catalysts varies between about 120° C. and 260° C. and is preferably maintained between about 175° C. and 225° C. While a wider temperature range could be employed, it has been found advisable to conduct the reaction within the above specified temperature range when employing the herein-disclosed catalysts, since at substantially lower temperatures the rate of reaction is so slow as to make the process commercially impractical and at substantially higher temperatures the lard is damaged so as to make its subsequent bleaching and refining too costly for commercial operation.

A large number of organic salts and compositions are effective in accomplishing the purpose of the present invention, including both alkaline reacting compositions and acidic reacting compositions. Among the organic salts and compositions which have been found effective as catalysts in modifying the crystal form of lard and animal triglyceride molecules in general are the organics, such as the alkoxides, comprising the alcoholates of mono-, di-, and polyhydroxy alcohols. Of particular utility in the present invention are the alcoholates of the lower molecular weight mono- and dihydroxy alcohols having about 8 carbon atoms per molecule or less in which the hydrogen atom of a hydroxy group of the alcohol is replaced by an alkali metal, although many of the polyvalent metal alcoholates and alkoxides are also effective. The alcoholates of the higher mono- and dihydric alcohols, the trihydric alcohols, and other polyhydric alcohols are also useful in effecting crystal modification but requires somewhat higher temperatures and longer periods of treatment than do the salts of the lower mono- and dihydroxy alcohols. By way of example, crystal modified lard having the improved properties herein described has been obtained upon heating lard with a crystal modifying catalyst, such as sodium methylate, sodium glycolate, sodium propylene glycolate, sodium salt of benzyl alcohol, sodium octylate, sodium laurylate; the potassium and lithium salts of each of the foregoing alcoholates; magnesium methoxide, calcium glycerinate, sodium cetylate, and sodium mannitolate; and other compositions within the classes illustrated and suggested by the foregoing compositions. Metallic sodium, sodium hydroxide, sodium amide, sodium hydride, or dispersions of the same are also effective under substantially the same conditions as the alkaline alcoholates.

When employing the herein-disclosed organic catalysts, the lower limit of the effective temperature range is the temperature above that at which the highest melting point constituent of the animal fat being treated will begin to crystallize from the liquefied fatty material, since removal of the higher melting point constituents is undesirable. This lower temperature limit is, therefore, substantially about 50° C. and generally at least 60° C. Treatment of the fatty material with the herein-disclosed alkaline crystal modifying catalysts at temperatures substantially above 200° C. is considered undesirable. The acual temperature limits within which satisfactory treatment can be obtained in accordance with the present invention will vary somewhat with the particular catalyst employed. For example, the more active catalysts such as the methylates, ethylates, glycol salts, propylene glycol salts, and benzyl alcohol salts all have about the same effective temperature range, and crystal modifying treatment with the foregoing catalysts is considered feasible within a temperature range of about 60° C. to 120° C. and preferably within a temperature range of about 70° C. and 100° C. When catalysts such as the higher mono-, di-, and polyalcoholates are used, temperatures above 150° C. and not substantially above 200° C. are employed most effectively. The class of lower polyhydroxy alcoholates, such as sodium glycerinates and potassium glycerinates, are effective catalysts for crystal modification at temperatures between about 150° and 175° C. It can generally be said that the higher molecular weight monoalcoholates, such as sodium cetylate, and the higher polyhydroxy alcoholates, such as sodium pentaerythritolate require heating to temperatures of about 200° C. for effective crystal modification. The most effective temperature which should be employed for a particular catalyst within the herein-disclosed class of catalysts may be readily determined by one skilled in the art in accordance with the present disclosure and the characteristics of the modified glyceride material described herein.

The time of treatment required to produce crystal modification also varies, depending upon the temperature, the concentration and specific catalysts employed, and upon the composition and purity of the animal triglyceride material being modified. Thus, when sodium methylate was used as the crystal modifying catalyst, lard in one instance was completely crystal modified by the time all the catalyst was added which was within 3 to 5 minutes at a temperature of about 86° C., with the catalyst concentration being 0.35 to 0.50 per cent based on the weight of the fatty material. At a lower temperature around 82° C. with a concentration of sodium methoxide catalyst of .3 per cent, the time of treatment may be somewhat longer, but crystal modification will generally be complete within about 30 minutes and one hour at temperatures above 60° C.

The effective concentration of the particular catalyst also depends upon several variable factors. These variables include the amount of moisture and the amount of free fatty acid in lard being treated, and to a lesser extent on the condition of the fatty material being treated. In general, the higher the moisture and free fatty acid content, the greater is the amount of catalyst required. Concentrations of the organic catalyst of between 0.15 per cent and about 2 per cent and above may be used without interfering with the crystal modification treatment, although a concentration between 0.20 and 0.5 per cent based on the weight of the animal fatty material being treated is normally sufficient and for economic reasons is preferred.

The above catalysts, both organic and inorganic, will be recognized as those of the type known to the prior art as interesterification catalysts, and the temperatures given above and elsewhere in the specification will also be recognized as the interesterification temperatures appropriate to such catalysts, although when treating lard there is believed to be no substantial net or resultant interesterification since the distribution of fatty acid radicals between the various glyceride molecules is already substantially that which would be produced by any interesterification which might take place. Accordingly, the terms "interesterification catalyst" and "crystal modification catalyst" are used interchangeably throughout the specification and appended claims to cover the same catalysts.

In order to facilitate the crystal modifying reaction and to reduce to a minimum the amount of catalyst required, it has generally been found advisable to conduct the reaction in a closed system under an inert atmosphere. By excluding air during the treatment, there is less danger of damage being done to the triglyceride material so that the subsequent handling thereof is facilitated and rendered less costly.

While, as indicated above, it is preferable to conduct the modification of lard within a closed vessel and under a pressure of inert gas, it is to be understood that the improved results derived from this method are not due entirely to the exclusion of air. While this probably plays a part in the results, it is clearly not the sole factor as is evident from the fact that although a vacuum may be used, better results are achieved when the reaction is carried out under atmospheric conditions. It has been discovered that higher pressures, as a general rule, produce better results. Any inert gas may be used in effecting such pressures, as for example hydrogen, nitrogen, or the like. Furthermore, since pressure appears to be the decisive factor, it is also within the contemplation of the present invention to use a closed vessel without an inert gas and to utilize the pressure which is developed by the reaction mixture itself upon the application of heat thereto. The exact degree of pressure to be applied within the closed vessel will vary depending on the catalyst and temperature used. As a general rule, a pressure range of from 1 to 100 pounds per square inch produces desirable results, although higher pressures may be used if desired. With most catalysts, and under the conditions specified herein, a pressure of from 3 to 50 pounds per square inch is generally satisfactory. The use of a closed reaction vessel and applied pressure has been found desirable in connection with all crystal modifying catalysts. Any reaction vessel known to the art which is capable of being sealed in such a manner as to withstand the pressures developed may be used in practicing this preferred form of the invention, and it is not intended to restrict the scope of the invention to any particular form of closed reaction vessel. It has been observed that by following this preferred method, i. e., carrying out the reaction in an enclosed zone in the presence of an inert gas pressure, a reduced amount of catalyst is required as illustrated in Example XXVIII. Additionally, as illustrated by Examples XXVI and XXVII, this preferred method also results in a better color in the finished lard, a consequent reduction in the amount of bleaching earth required, and a reduction in the refining loss of catalyst.

The lard may be heated in the presence of the catalyst at any stage of processing, and the beneficial results of the crystal modifying treatment are not impaired by subsequent processing, such as deodorization and hydrogenation. It is also unnecessary to hold the crystal modified product at any particular temperature in order to retain the beneficial properties imparted to the material. It is preferred to treat the lard with the catalyst prior to refining thereof. Where it is desired to omit the treatments generally employed to impart improved characteristics, the rendered lard may advantageously be directly heated in the presence of the herein-disclosed catalysts to produce crystal modified lard.

The following specific examples should be considered as merely illustrative of the herein-disclosed process and resulting product and should in no way be construed to limit the invention to the particular materials or conditions disclosed therein.

EXAMPLE I 2,000 grams of killing lard and 15 grams of stannous chloride were heated at 225° C. under 2 to 3 mm. of vacuum for 75 minutes, the mixture being constantly agitated by a stream of water vapor. The treated lard was refined and texturized. A portion of the original killing lard was chilled in a similar fashion for comparison; that is, it was rapidly agitated in an ice bath until plastic. This latter product, after chilling, had a waxy rubbery texture, while the chilled treated lard was softer, more plastic and resembled hydrogenated vegetable shortenings in general appearance. The two samples were tempered at 75° F. and then set at various temperatures for a period of 24 hours. The consistometer readings, obtained with the Bloom consistency tester, are given in the table below and further indicate that a profound change occurred in the crystal nature of the treated lard:

Table 1

| Temperature, °F. | Bloom Consistometer Readings | |
|---|---|---|
| | Untreated Lard | Treated Lard |
| 75 | 32-35 | 0 |
| 60 | 44-47 | 17-21 |
| 45 | 79-86 | 85-88 |
| 32 | 150 | 113 |

In accordance with the principle of the Bloom consistency tester, the higher the numerical values, the firmer the lard. Thus, at 75° F. the catalytically treated lard was soft and therefore offered no resistance to the head of the plunger of the consistometer, and therefore a value of zero was obtained. On the other hand, the untreated lard at 75° F. was comparatively firmer and a consequent value of 32 was registered by the gauge.

An X-ray diffraction pattern of the treated lard more closely resembles that of a hydrogenated cotton seed oil shortening than that of the original killing lard, which further illustrates that a fundamental alteration of the crystal nature of the lard has been effected.

In the baking tests with these two lards, the volume of the pound cake obtained with the treated lard was approximately 40 per cent greater than the volume of the cake made with untreated lard. The specific gravity of the batter of the treated lard was 0.800 as compared with 1.035 for the control sample of original lard. The wet cream specific gravity of the treated lard was 0.550 as compared with 0.730 for the control sample of original lard.

The following examples illustrate the treatment of lard with various crystal modifying substances. In all cases the treated lard possessed a striking appearance, which was quite different from that of untreated lard. The treated lard had a characteristic satiny luster that readily distinguished it from conventional lard. In addition the plastic properties of the treated lard were superior, and cakes made therewith had a larger volume and a finer grain and texture than the cakes made with untreated lard, indicating that dough prepared with the modified lard is capable of entrapping greater quantities of air than is the case with dough made with untreated lard. The texture and fine grain of the cakes also indicate a uniform dispersal of the air throughout the dough.

EXAMPLE II 2,300 pounds of bleached prime steam lard were heated to 205° C. for 2.5 hours in the presence of 0.2 per cent stannous chloride, $SnCl_2 \cdot 2H_2O$, based on the weight of the lard. A control sample of the same prime steam lard was heated under the same temperature and time conditions as above but without the catalyst being present. The lard in each instance was cooled to about 66° C., refined, and combined with 135 pounds of hydrogenated triglyceride material (e. g., 50–60 titer lard). The compounded lard was then bleached, deodorized, chilled in standard internal chilling apparatus, and a portion thereof filled into suitable containers under the following conditions:

Table 2

| Sample | Chilling Temperature in Votator (°F.) | Bloom Consistometer Readings | |
|---|---|---|---|
| | | Control Sample | Test Sample |
| A | 68 | 0 | 21 |
| B | 66 | 3 | 25 |
| C | 64 | 6 | 25 |

The remainder of each of the above samples of crystal modified lard was stored for 7 days at 75° F. and was filled under the identical conditions employed in Table 1 with the following results:

Table 3

| Sample | Chilling Temperature in Votator (°F.) | Bloom Consistometer Readings | |
|---|---|---|---|
| | | Control Sample | Test Sample |
| A | 68 | 9 | 20 |
| B | 66 | 30 | 32 |
| C | 64 | 60 | 30 |

As product control specifications require that the Bloom consistency of the lard fall between 15 and 36, it is evident that only one of the control samples is able to meet the required specifications, whereas each of the test samples comprising crystal modified lard meets the control specifications. The foregoing clearly shows that the chilling temperature in the filling apparatus is less critical for crystal modified lard than for unmodified lard.

Table 4

| Analysis | Control Sample | Test Sample |
|---|---|---|
| Titer (°C.) | 41.2 | 41.4. |
| Iodine number | 60.8 | 60.7. |
| Saponification number | 197.5 | 197.3. |
| Glycerine | Less than 0.5% | Less than 0.5%. |
| Monoglycerides | 0.16 | 0.19. |
| Linoleic acid | 10.7 | 10.3. |
| Linolenic acid | 0.65 | 0.62. |

It is evident from the foregoing that there has been no appreciable change in the chemical composition of the lard after treatment.

The treated lard possessed a smooth, velvety sheen and was superior in appearance and in textural properties to the control sample.

EXAMPLE III 80 pounds prime steam lard were combined with 0.2 per cent stannous chloride based on the weight of the lard and heated for 5 hours in a deodorizer at 202° C. (395° F.). Samples of lard being treated were taken at the intervals indicated in the following table:

Table 5

| Sample No. | Time (min.) | Temperature (°F.) | Free Fatty Acid (percent) | Titer (°C.) | Melting Pt. (°F.) | Sap. No. |
|---|---|---|---|---|---|---|
| Orig | 0 | 75 | 0.95 | 36.8 | 110 | 195.7 |
| 1 | 0 | 390 | 1.63 | 37.0 | 108 | 197.9 |
| 2 | 30 | 395 | 2.08 | 36.1 | 107 | 197.0 |
| 3 | 60 | 395 | 2.09 | 37.0 | 107 | 196.9 |
| 4 | 120 | 395 | 2.06 | 36.6 | 108 | 197.0 |
| 5 | 180 | 395 | 1.91 | | | |
| 6 | 300 | 395 | 1.68 | 36.7 | 107 | 196.6 |

It is evident from the foregoing table that there has been no significant change in the lard during the catalytic heat treatment, except that the free fatty acid content had increased somewhat above its initial value of 0.95 per cent. The slight drop in the melting point which takes place during the initial stage of treatment is not considered significant since it does not alter the subsequent processing conditions employed in texturizing and compounding the lard into a conventional shortening product. For example, the chilling temperature in the internal chilling machine used for texturizing is not changed, nor is the quantity and type of lard fat combined with the treated lard to form a conventional compounded shortening altered.

Each of the foregoing hourly samples was refined with caustic, filtered, and formulated with hard lard in the conventional manner on the standard basis of 85 per cent crystal modified lard and 15 per cent hard lard (50–60 titer). The formulated lard was texturized and stored at a temperature of about 77° F. The following performance data was obtained:

Table 6

| Sample | Bloom Consistency Readings at 77° F. | Pound Cake | | Wet Cream Test, Sp. Gravity |
|---|---|---|---|---|
| | | Volume (cc.) | Batter, Sp. Gravity | |
| Orig | 46 | 1,330 | .800 | .570 |
| 1 | 39 | 1,300 | .810 | .595 |
| 2 | 25 | 1,375 | .770 | .515 |
| 3 | 19 | 1,405 | .745 | .505 |
| 4 | 18 | 1,430 | .715 | .460 |
| 5 | 15 | 1,450 | .705 | .450 |
| 6 | 9 | 1,490 | .695 | .435 |

The compounded lard exhibits a gradual decrease in consistency readings as the duration of the catalytic treatment increases. Simultaneously, the volume of the pound cake increases while the specific gravity of pound cake batter and the wet cream test decreases. In each instance the volume of the pound cake obtained with the crystal modified lard is substantially greater than that obtained from a similar lard shortening which does not include crystal modified lard as the basic constituent thereof. Likewise, the specific gravity of the pound cake batter and the wet cream test is less than the corresponding specific gravity obtained with a lard shortening which does not have crystal modified lard as the base thereof. There does not appear to be any advantage in prolonging the treatment substantially beyond 5 hours.

The treated samples possessed a smoother, more velvety appearance and had improved textural properties when compared with the control sample of lard.

EXAMPLE IV 25,000 pounds of prime steam lard having added thereto 0.2 per cent stannous chloride based on the weight of the lard were heated in a converter under 5 pounds hydrogen pressure at about 200° C. for a period of 4 hours. Samples were taken at one-hour intervals.

*Table 7*

| Sample No. | Time (hrs.) | Free Acid (percent) | Melting Point (° F.) | Saponification No. | Iodine No. |
| --- | --- | --- | --- | --- | --- |
| Orig | 0 | 0.43 | 108 | 195.2 | 69.8 |
| 1 | at 395° F. | 1.08 | 107 | 195.0 | 69.4 |
| 2 | 1 | 1.08 | 104 | 195.4 | 69.4 |
| 3 | 2 | 1.10 | 104 | 195.6 | 69.1 |
| 4 | 3 | 1.12 | 102 | 195.8 | 69.9 |
| 5 | 4 | 1.13 | 102 | 195.6 | 69.8 |

With the exception of an increase in the free fatty acid content, there is no significant change in the lard after treatment. The slight lowering of the melting point indicates no significant alteration of the melting point characteristics of the treated lard.

Samples of the above lard were refined, bleached, and then chilled while being agitated. There was a very apparent difference in the appearance of the texturized products. The original lard heated without a catalyst had a waxy appearance whereas the final sample taken at the end of the 4-hour treating period had a velvety sheen and a smooth, creamy consistency. Also, when temperature readings of samples of the crystal modified lard and the unmodified lard were taken while being chilled either before or after compounding and the readings plotted on temperature-time coordinates, uniform cooling curves were obtained with the samples containing the crystal modified lard, whereas there was a noticeable irregularity in the cooling curves of the control samples of unmodified lard.

The foregoing samples were stored at 75° F. for 5 days and then were tested to determine the specific gravity in the wet cream test and the volume of a pound cake produced by the said lard.

*Table 8*

| Sample No. | Wet Cream, Specific Gravity | Pound Cake Volume (cc.) |
| --- | --- | --- |
| Orig | .860 | 900 |
| 1 | .775 | 900 |
| 2 | .745 | 910 |
| 3 | .705 | 975 |
| 4 | .635 | 1,100 |
| 5 | .545 | 1,225 |

The X-ray diffraction patterns of the above samples of lard show that there has been a progressive reorientation of the crystal structure thereof during the treating period, also with secondary fundamental changes occurring, making the crystal modified lard diffraction pattern resemble more closely that of hydrogenated cottonseed shortening than the original untreated lard.

Each of the above samples of lard was formulated into a shortening by compounding 85 per cent treated lard with 15 per cent hard fat (50–60 titer lard) to give the standard consistency, and then chilling while being rapidly agitated (texturized). The samples were then held at 75° F. for 4 days and tested by the bakery for the specific gravity of the wet cream test and the volume of a pound cake produced by the said shortening.

*Table 9*

| Sample No. | Wet Cream, Specific Gravity | Pound Cake, Volume (cc.) |
| --- | --- | --- |
| 0 | .640 | 1,375 |
| 1 | .605 | 1,380 |
| 2 | .560 | 1,450 |
| 3 | .550 | 1,465 |
| 4 | .575 | 1,405 |
| 5 | .600 | 1,400 |

The above samples were also stored at a temperature of 97° F. and periodically compared with a control sample of the original lard which had not been heated in the presence of a catalyst. While both the control and the crystal modified lard-containing sample exhibited a very satisfactory appearance at the end of the third day, there was a very noticeable difference between the two samples by the end of the second week. The control sample appeared to have a dull appearance and a stiff or relatively hard, crinkly texture, whereas the crystal modified lard-containing sample retained its original velvety sheen and smooth creamy texture. As the holding period continued, the foregoing differences were even more apparent, with the crystal modified sample retaining its attractive appearance for 7 weeks, at which time the test was terminated.

After holding the control and test sample No. 3 for a period of four and a half weeks at 97° F., portions thereof were returned to 75° F. and tested in the bakery to give the following results:

*Table 10*

| Test | Shortening, Control Sample | Shortening, Crystal Modified Sample #3 |
| --- | --- | --- |
| Specific gravity of pound cake batter | 1.000 | .760 |
| Volume of pound cake, cc | 1,050 | 1,410 |

The foregoing data clearly show that the compounded shortening containing crystal modified lard retains most of its improved appearance and cake-baking properties on storage at an elevated temperature, whereas the shortening containing unmodified lard becomes very poor in appearance, texture, and cake-baking ability under the same storage conditions. It should be particularly noted that the volume of the pound cake produced by the shortening containing crystal modified lard was 1465 cc. (Table 9) prior to storing at 97° F. and was 1410 cc. (Table 10) after storing at 97° F. for four and a half weeks. In contrast therewith, the volume of the pound cake produced by the shortening containing unmodified lard decreased sharply from 1375 cc. (Table 9) to 1050 cc. (Table 10) on storing at 97° F. for four and a half weeks. Similar comparative results have been obtained on holding for a prolonged period uncompounded crystal modified lard and compounded shortenings containing hardened vegetable or animal fat, with and without mono- and diglycerides being added in the conventional amounts. This ability of crystal modified lard and compounded shortenings made therefrom to retain their improved appearance, texture and cake-baking properties after prolonged storage and on storage under adverse conditions is an extremely important characteristic of crystal modified lard. And, even when the increase in the volume of a pound cake produced by the crystal modification treatment is considered only moderate as compared with the original lard, it has been consistently observed that the lard treated in accordance with the herein-disclosed process and shortenings made therewith retain their original desirable appearance, textural, and performance characteristics for a prolonged period of storage under adverse conditions, whereas the untreated lard and shortening products made therefrom lose their desirable characteristics in a relatively short time.

EXAMPLE V 2,000 grams of prime steam lard were heated to 168° C. and mixed with 0.7 per cent solid stannous hydroxide supported on kieselguhr. After addition of the catalyst the mixture was heated to 224° C. and the temperature maintained at 224° C. for 2 hours under an inert atmosphere of nitrogen. At the same time an equal quantity of prime steam lard was treated in a similar fashion except that the addition of a catalyst was omitted. At the end of the heating period both samples of lard were refined with 15.4 grams of an 85 per cent solution of phosphoric acid by stirring a few minutes at 71° C. A diatomaceous earth such as fuller's earth was then added and the temperature then raised to 82° C. with stirring. The products were filtered and then texturized by chilling with rapid agitation in an ice bath until plastic. The melting point of the treated lard was 106° F. as compared with 107° F. for the untreated sample, a variation which is considered to be insignificant and which indicates no significant alteration of the melting point characteristics of the treated lard.

Samples of the treated and untreated lard were left overnight at 75°, 60°, 42°, and 32° F. and consistencies of the samples then determined, using the consistency tester described in U. S. Patent 2,119,699 to Bloom.

Table 11

| Temperature, ° F. | Bloom Consistency Readings | |
|---|---|---|
| | Untreated Lard | Treated Lard |
| 75 | 20 | 0 |
| 60 | 52 | 6 |
| 42 | 80 | 83 |
| 32 | 145 | 150 |

The foregoing tests indicate that although no substantial change in melting point characteristic was evidenced, a drastic change of the crystal nature of lard by the catalytic treatment thereof was effected.

A cake baking test was then performed, the test being further evidence of a profound difference between catalytically treated lard and lard which had not so been treated, as above described. Two pound cakes were made, employing the same amounts of ingredients, including fat, and the same conditions of baking. The only difference in the preparation of the two cakes was the addition of catalytically treated lard to the batter of one cake and untreated lard to the other. The batter made with treated lard had a specific gravity of 0.870 while the batter of the cake made with untreated lard had a specific gravity of 1.090. The cake which was baked with treated lard showed an increase of volume of more than 40 per cent over the volume of the other cake. Moreover, the pound cake made with treated lard had a grainy, even texture while the cake made with ordinary lard had a dense, soggy texture with dense centers of agglutinated dough dispersed throughout the mass.

When 100 grams of the above treated lard were dissolved in 1,000 grams of petroleum ether and stored for 5 days at 450° F., 3.8 grams of solid triglyceride crystallized from the solvent as compared with the 3.7 grams of solid material crystallized from untreated lard under the foregoing conditions. It is evident there has been no significant change in the proportion of the higher melting point constituents as a result of the herein-disclosed crystal modification treatment.

EXAMPLE VI 2,500 pounds of bleached prime steam lard were pumped into a converter and thoroughly dried by heating at a temperature above 100° C. Thereafter 0.2 per cent freshly prepared stannous hydroxide based on the weight of the lard was mixed with the dry lard and heated to a temperature of 205° C. while agitating normally and under a pressure of 30 pounds of hydrogen. Samples were taken of the original lard, and at the end of each hour of heating. Each sample was cooled to 150° F., filtered, and pumped to a refining tank where it was washed with 20 per cent water based on the weight of the lard for 20 minutes and then passed through a centrifuge. The treated samples were then deodorized and bleached in accordance with regular plant practice and filtered under normal operating conditions. Each sample was analyzed with the following results:

Table 12

| Sample | Time (hrs.) | Melting Pt. (° F.) | Free Fatty Acid (percent) | Iodine No. | Linol. | Spect. Analyses | | Conj. Di. |
|---|---|---|---|---|---|---|---|---|
| | | | | | | Linolen. | Arach. | |
| A | 0 | 109 | 0.45 | 67.5 | 10.42 | 0.46 | 0.39 | 0.22 |
| B | 1 | 106 | 1.0 | | | | | |
| C | 2 | 105 | 1.05 | | | | | |
| D | 3 | 104 | 1.20 | | | | | |
| E | 4 | 104 | 0.95 | 68.2 | 10.41 | 0.48 | 0.37 | 0.23 |
| F | 5 | 105 | 1.05 | | | | | |

Table 13

| Sample | Bloom Consistometer Readings | Set Point (° F.) | Pound Cake | | Wet Cream Sp. Gr. |
|---|---|---|---|---|---|
| | | | Sp. Gr. | Volume (cc.) | |
| A | 64 | 41.6 | 0.770 | 1,265 | 0.585 |
| B | 40 | 41.4 | 0.700 | 1,380 | 0.515 |
| C | 32 | 41.3 | 0.730 | 1,360 | 0.550 |
| D | 35 | 41.3 | 0.740 | 1,295 | 0.535 |
| E | 35 | 41.2 | 0.745 | 1,310 | 0.565 |
| F | 37 | 41.2 | 0.750 | 1,300 | 0.570 |

It is apparent from the foregoing table that whereas there is a continuing change in the lard after the second hour of treatment, there is no advantage in prolonging the treatment and an actual disadvantage in so doing since the volume of the pound cake decreases and the specific gravities increase. Under the foregoing conditions, it is evident that crystal modification is complete between the first and second hour of treatment.

When a small portion of sample C was texturized by chilling and agitating, it was evident that an unusually large volume of air was occluded in the crystal modified lard during the texturizing operation. On standing, the sample exhibited a remarkable ability to retain the occluded air, and even when the sample was heated on a steam bath, much of the air was retained by the melted lard. This ability of the treated lard to retain a relatively large volume of air, even at an elevated temperature, may account for the crystal modified lard producing pound cakes of substantially increased volumes.

EXAMPLE VII 2,000 grams of prime steam lard were mixed with a 1.0 per cent stannic chloride based on the weight of the lard to form a uniform mixture, and heated in an open flask for one hour at 200° C. with constant stirring. At the end of the foregoing heating period the treated lard was refined, bleached, and filtered.

The lard treated in the foregoing manner gave much lower Bloom consistency readings at temperatures above 45° F. than untreated lard and retained a substantially larger volume of air and had a lower specific gravity after texturizing than did the control sample of unmodified lard.

EXAMPLE VIII 2,000 grams of prime steam lard were mixed with 2.0 per cent stannous sulfate based on the weight of the lard to form a uniform mixture, and heated in an open flask at 200° C. for 5 hours with constant stirring. The treated lard was refined, bleached, and filtered.

The treated lard gave much lower Bloom consistency readings at temperatures above 45° F. than the untreated lard, retained a substantially larger volume of air, and had a much lower specific gravity than the control sample of unmodified lard.

EXAMPLE IX 2,000 grams of prime steam lard were admixed with 2.0 per cent stannic sulfate based on the weight of the lard to form a uniform mixture, and then heated in an open flask at 200° C. for 3 hours with constant stirring.

The treated lard had substantially lower Bloom consistency readings at temperature above 450° F. and possessed superior textural properties since it retained substantially larger volumes of air when texturized.

EXAMPLE X 2,000 grams of prime steam lard were admixed with 0.5 per cent bismuth nitrate based on the weight of the lard to form a uniform mixture, and heated in an open flask for 2.5 hours at a temperature of 225° with constant stirring. At the end of the heating period, the treated lard was refined, bleached, and filtered.

The crystal modified lard produced by the foregoing treatment gave much lower Bloom consistency readings at temperatures above 45° F., retained a substantially larger volume of air, and possessed a lower specific gravity after texturizing than the unmodified control sample.

When made into a compounded shortening by mixing 86 per cent of the modified lard with 14 per cent hardened lard (50–60 titer) and incorporated in the conventional pound cake batter, a pound cake having a volume of 1460 cc. was obtained and a pound cake batter having a specific gravity of 0.730. The wet cream specific gravity was 0.520. The unmodified lard compounded in the foregoing manner produced a pound cake having a volume of 1300 cc., a batter specific gravity of 0.825, and a wet cream specific gravity of 0.590.

EXAMPLE XI 2,000 grams of dried prime steam lard were admixed with 0.1 per cent aluminum chloride and heated in an open flask to 200° C. for a period of 4 hours, and samples were taken at the end of each one-hour period of heating.

*Example 14*

| Time Sample Treated (Hours) | Free Fatty Acid (percent) | Bloom Consistency Readings |
|---|---|---|
| 1 | 1.2 | 33 |
| 2 | 1.3 | 32 |
| 3 | 1.4 | 35 |
| 4 | 1.6 | 44 |

Each of the samples was refined, bleached, filtered, and compounded with 14 per cent hardened lard (50–60 titer) based on the weight of the treated lard to form a blended shortening. Each sample was examined in the bakery laboratory with the following results:

*Table 15*

| Time Sample Treated (hrs.) | Pound Cake Specific Gravity | Pound Cake Volume (cc.) | Wet Cream, Specific Gravity |
|---|---|---|---|
| 1 | .815 | 1,375 | .625 |
| 2 | .675 | 1,400 | .590 |
| 3 | .785 | 1,360 | .615 |
| 4 | .785 | 1,355 | .650 |

It is evident from the foregoing table that the optimum results are obtained by heating the prime steam lard for 2 hours in the presence of the aluminum chloride under the specified conditions. When heating is prolonged appreciably, it appears that the lard is adversely affected, since the consistency increases and the volume of the pound cake decreases significantly.

EXAMPLE XII 2,000 grams of bleached, prime steam lard were admixed with 0.1 per cent titanium tetrachloride based on the weight of the lard, and heated in an open flask at a temperature of 200° C. for one hour with constant stirring. At the end of the heating period the treated lard was refined, bleached, and filtered.

The treated lard gave lower Bloom consistency readings at temperatures above 45° F., retained a substantially larger volume of air when texturized, and had a more attractive velvety sheen and smoother texture than the control sample of unmodified lard.

When made into a compounded shortening by mixing 86 per cent of the modified lard with 14 per cent hardened lard (50–60 titer) and incorporated in the conventional pound cake batter, it produced a pound cake having a volume of 1425 cc. and a batter specific gravity of 0.780. The wet cream specific gravity was 0.575. The unmodified lard compounded in the foregoing manner produced a pound cake having a volume of 1270 cc., and a batter specific gravity of 0.820, and a wet cream specific gravity of 0.610.

EXAMPLE XIII 2,000 grams of bleached prime steam lard were heated in an open flask admixed with 2.0 per cent aluminum stearate based on the weight of the lard at a temperature of 200° C. for one hour with constant stirring. The treated lard was then refined, bleached, and filtered.

The treated lard had the characteristic properties of crystal modified lard, and when compounded by mixing 86 per cent of the treated lard with 14 per cent hard lard (50–60 titer) and incorporated in the conventional pound cake batter, it produced a pound cake having a volume of 1445 cc. and a batter specific gravity of 0.760. The wet cream specific gravity was 0.550. The unmodified lard compounded in the foregoing manner produced a pound cake having a volume of 1310 cc., a batter specific gravity of 0.825 and a wet cream specific gravity of 0.595.

EXAMPLE XIV 2,000 grams of bleached prime steam lard were heated in an open flask admixed with 2.0 per cent magnesium nitride based on the weight of the lard at a temperature of 225° C. for a period of 4 hours with constant stirring. The treated lard was refined, bleached, and filtered, and was found to possess characteristic properties of crystal modified lard.

EXAMPLE XV 2,000 grams of prime steam lard were admixed with one-half per cent lead dioxide based on the weight of the lard, and heated in an open flask at a temperature of 200° C. for 2 hours with constant stirring. The lard was then refined, bleached, and filtered, and exhibited characteristic properties of crystal modified lard by giving lower Bloom consistency readings at temperatures above 45° F.

and retaining an increased volume of air when texturized. The treated lard produced a pound cake having a volume of 1325 cc. and a batter specific gravity of 0.785. The unmodified lard produced a pound cake having a volume of 1100 cc. and a batter specific gravity of 0.950.

EXAMPLE XVI 2,000 grams of bleached, prime steam lard were admixed with one-half per cent lead carbonate $(PbCO_3)_2 Pb(OH)_2$, based on the weight of the lard, and heated in an open flask at a temperature of 200° C. for a period of 3 hours with constant stirring. The lard was then refined, bleached, and filtered.

The treated lard possessed the characteristic properties of crystal modified lard, and when used in baking the conventional pound cake produced a larger pound cake volume than the control sample of unmodified lard.

EXAMPLE XVII 2,000 grams of prime steam lard were admixed with one-half per cent zinc chloride based on the weight of the lard, and heated in an open flask at a temperature of 200° C. for a period of 3 hours with constant stirring. The treated lard was refined, bleached, and filtered.

The treated lard possessed the characteristic properties of crystal modified lard in that it exhibited lower Bloom consistency readings with temperatures above 45° F. and retained a substantially larger volume of air when texturized than the control sample of unmodified lard.

EXAMPLE XVIII 2,000 grams of prime steam lard were admixed with 0.2 per cent zinc acetate based on the weight of the lard, and heated in an open flask at a temperature of 200° C. for a period of 4 hours with constant stirring. The lard was then refined, bleached, and filtered.

The treated lard exhibited the characteristic properties of crystal modified lard.

EXAMPLE XIX 2,000 grams of prime steam lard were admixed with 2.0 per cent cobalt nitrate based on the weight of the lard, and heated in an open flask at a temperature of 225° C. for 2 hours with constant stirring. The lard was then refined, bleached, and filtered.

The treated lard exhibited a lower Bloom consistency at temperatures above 45° F. and retained a larger volume of air when texturized than the control sample of unmodified lard.

EXAMPLE XX 2,000 grams of bleached prime steam lard were admixed with 2.0 per cent cobalt chloride based on the weight of the lard, and heated in an open flask at a temperature of 245° C. for a period of 3 hours with constant stirring. The lard was then refined, bleached, and filtered.

The treated lard possessed the herein-disclosed characteristics of crystal modified lard.

EXAMPLE XXI 2,000 grams of bleached prime steam lard were admixed with 1.0 per cent ferric chloride based on the weight of the lard, and heated in an open flask at a temperature of 219° C. for 30 minutes with constant stirring. The lard was then refined, bleached, and filtered.

The treated lard exhibited a lower Bloom consistency at temperatures above 45° F., and when used in baking a pound cake produced a cake having a substantially larger volume than the control sample of unmodified lard.

EXAMPLE XXII 2,000 grams of bleached, prime steam lard were admixed with 2.0 per cent iron subsulfate, $Fe_4O(SO_4)_5$, based on the weight of the lard, and heated in an open flask at a temperature of 175° C. for 6 hours with constant stirring. The lard was then refined, bleached, and filtered and possessed the characteristic properties of crystal modified lard.

EXAMPLE XXIII 2,000 grams of prime steam lard were admixed with 2.0 per cent cadmium oxide based on the weight of the lard, and heated in an open flask at a temperature of 200° C. for one hour with constant stirring. The lard was then refined, bleached, and filtered.

The treated lard exhibited a lower Bloom consistency at temperatures above 45° F. and retained an appreciably larger volume of air when texturized than did the control sample.

EXAMPLE XXIV 2,000 grams of prime steam lard were admixed with 2.0 per cent antimony trichloride based on the weight of the lard, and heated in an open flask at a temperature of 220° C. for a period of 2.5 hours with constant stirring. The lard was then refined, bleached and filtered.

The treated sample gave a much lower Bloom consistency reading at temperatures above 45° F. than the untreated lard and retained a substantially larger volume of air when texturized than did the control sample.

EXAMPLE XXV

Prime steam lard (2,094 pounds) having a free fatty acid content of 0.44 per cent expressed as oleic acid was melted and mixed with diatomaceous earth and then heated to about 104° C. for about 5 minutes to remove substantially all moisture from the lard. The substantially dry lard was then filtered and contained 0.02 per cent moisture. The dry lard was then placed in an open steam jacketed kettle and 0.25 per cent sodium methoxide catalyst based on the weight of the lard was added. The temperature of the lard in the kettle was maintained at 86° C. while stirring constantly. After 25 minutes at the above temperature, the heating was discontinued and the lard cooled to about 65° C. About 100 pounds of water were then added in order to hydrate the catalyst. After allowing the foots to settle, the lard was pumped from the kettle and a yield of 96.2 per cent of the original lard was obtained as crystal modified lard. The modified lard was mixed with bleaching clay to decolorize the lard and filtered through appropriate filter presses. If the lard is not to be formulated into a compounded shortening which will be deodorized, it should be deodorized to remove traces of catalyst and other volatile matter. The final crystal modified lard had a free fatty acid content expressed as oleic acid of 0.04 per cent and a melting point of 42° C. compared with a melting point of 44° C. for the original lard. The crystal modified lard was softer, more plastic, and had a much lower consistency at room temperature, although the melting point had not changed appreciably.

EXAMPLE XXVI

In order to determine the effect of a vacuum as contrasted with atmospheric pressure on the crystal modifying reaction, a sample of prime steam lard was heated to 129° C. under vacuum in a laboratory iron reaction vessel equipped with positive agitation. To this sample, 0.2% of stannous chloride was added in the form of crystals. The mixture was then heated as rapidly as possible to 204° C. under vacuum. After one and one-half hours at these conditions, the free fatty acid content of the mixture had risen to 2.4 per cent. The same experiment was repeated in detail using the same lard, with the exception that during the reaction the lard was held at atmospheric pressure after the temperature passed 140° C. The free fatty acid analysis of this lard after one and one-half hours heating at 204° C. was only 1.9 per cent. In addition, the sample prepared at atmospheric pressure was lighter in color than the sample treated entirely under vacuum.

EXAMPLE XXVII

A further test was conducted to illustrate the improvement in free fatty acid content and color resulting from the use of higher pressures when carrying the crystal modifying reaction out in a closed vessel as contrasted with the use of low pressures, atmospheric pressure, or vacuum. In the same manner as set forth in Example XXVI, a sample of prime steam lard was heated under vacuum in a laboratory iron reaction vessel to 138° C., at which point 0.2 per cent of stannous chloride was added as a solution in water. The mixture was then heated under vacuum to 204° C. and held under these conditions for 1 hour. At the end of this time, the free fatty acid analysis was 2.0 per cent and the color was too dark to read on the Lovibond scale even with a 1 inch column. The same experiment was then repeated, with the exception that after the stannous chloride was added and held under vacuum long enough to remove all of the water, the reactor was opened to the atmosphere for the remainder of the run. After 1 hour at 204° C. and at atmospheric pressure, the free fatty acid content had risen to 2.1 per cent and the color was 9.7 red on the Lovibond scale using a 1 inch column. The same experiment was again repeated, except that after all of the moisture had been flashed off under vacuum, a pressure of 5 pounds per square inch of hydrogen was applied. The lard was then heated to 204° C. while maintaining the hydrogen pressure between 5 and 10 pounds per square inch. After 1 hour at these conditions, the lard had a free fatty acid analysis of 1.3 per cent and a color of 6.9 red. An additional run in the same manner as the preceding test, but utilizing a hydrogen pressure of 30 pounds per square inch resulted in a product having a free fatty acid analysis of only 1.16 per cent and a color on the Lovibond scale of 2.0 red. These experiments illustrate the substantial improvement in both free fatty acid content and color resulting from the use of a closed reaction vessel in combination with an inert gas pressure.

EXAMPLE XXVIII

As evidencing the decrease in the amount of catalyst required when operating under the preferred conditions of the present invention, a series of 6 runs was made on plant scale under the following conditions: Approximately 26,000 pounds of prime steam lard were thoroughly dried by heating in a closed iron vessel under vacuum. After the lard was dry, its temperature was adjusted to about 104° C. and 40 pounds of molten sodium was added to the lard as a crystal modifying catalyst. The mixture was agitated vigorously under vacuum at 104° C. for 5 to 15 minutes, and then the closed vessel was put under a pressure of 3 pounds per square inch of nitrogen. In each of 6 successive runs, the lard showed the characteristic reddish brown color indicative of complete crystal modification within 20–40 minutes after the pressure was applied. Each of the lards from these runs was then successfully refined and bleached to a satisfactory commercial color. Contrasted with these results, a second series of 6 runs was made in which the reactor was held under vacuum throughout the entire reaction period. Only in one case, when the catalyst was increased to 50 pounds, was crystal modification effected. In other cases, the lard darkened gradually without ever showing the characteristic reddish brown color, and complete crystal modification of these batches was not effected. When these lards, whether completely crystal modified or not, were refined and bleached, the finished product was too dark for commercial purposes.

The various lards, illustrated in the foregoing examples, are often hydrogenated after crystal modification if they are to be incorporated into a shortening, although such hydrogenation is not essential to the production of a good quality shortening as is shown by Examples II–IV and X–XIII. Additionally, the lard may be hydrogenated, either fully or partially, prior to crystal modification without producing any deleterious effect on the modification reaction.

In order to determine suitable catalysts and optimum operating conditions for the herein-disclosed crystal modifying treatment, one or more empirical tests may be employed. For example, it has been the practice to run a wet cream test, a water absorption test, and pound cake baking test on the crystal modified lard or on the shortening comprising the crystal modified lard. By comparing the results of the foregoing tests on the treated lard with the results obtained on the control sample, it is possible to chart the course of the crystal modifying reaction and to determine when the crystal modifying treatment has taken place. Thus, when one observes a substantial decrease in the specific gravity of the lard-water emulsion in the wet cream test, a substantial increase in the amount of water which is taken up by the crystal modified material in the water absorption test, or an appreciable increase in the volume of a pound cake in the baking test, crystal modification will have taken place. Other tests based on the herein-disclosed characteristics of crystal modified lard may be conducted, such as taking Bloom consistency readings of the product being treated at temperatures above about 45° F., as the crystal modified product exhibits a substantially lower consistency between about 45° F. and the melting point of the product than does the unmodified lard at the same temperature.

While the foregoing wet cream test, water absorption test, and pound cake baking test are well known to those skilled in the art, the precise procedure employed in conducting these tests is as follows:

Wet cream test

FORMULA 530 grams confectionery sugar
414 grams shortening
56 grams water

METHOD

Have all ingredients at 75° F. Place these ingredients in a 10 quart mixing bowl of a Hobart C–10 machine or the equivalent. Mix for one-half minute at low speed. Scrape down the bowl and beater and then mix for five minutes at second speed. Scrape down the bowl and beater and then mix for five minutes at second speed. Weigh a representative 20 cc. portion of the creamed mass to obtain the specific gravity. Continue creaming at second speed, and take gravity readings again at 15 minutes and at 25 minutes. The bowl and beater should be scraped down after each gravity reading. Total mixing time at second speed: 25 minutes. Gravity readings to be reported: 5, 15, and 25 minutes intervals. Convert weighings into specific gravity and report as grams per cc.

Water absorption test

Place one pound (454 grams) of shortening material at 75° F. into the 10 quart mixing bowl of the bench Hobart Model C–10 or equivalent mixer. Mix for one-half minute at second speed. Scrape down bowl and beater. Water at 75° F. is then added by means of a mayonnaise oil dripping tank at the rate of 30 cc. per minute, the machine running continuously at second speed.

The machine should be stopped at intervals and the water shut off in order to inspect the mix for unemulsified droplets of water. During these inspections, the upper rim of the mix should be scraped down. When droplets of water are present on the surface of the beaten shortening material, the machine should be turned on and run for two minutes with the water shut off. If the droplets are still present, the test is completed. If the droplets are absorbed, more water should be added until the above procedure shows unemulsified droplets present.

To maintain a constant flow of water (30 cc. per minute) a constant level should be kept in the salad oil tank. Report the grams of water emulsified by 1 pound of the shortening material.

*Pound cake baking test (without monoglycerides)*

FORMULA

|  | Lbs. | Ozs. |
|---|---|---|
| Group 1: | | |
| Shortening material (containing no monoglycerides) | 0 | 12 |
| Sugar | 1 | 8 |
| Flour (cake) | 0 | 12 |
| Salt | 0 | ¼ |
| Vanilla | 0 | ¼ |
| Milk | 0 | 5 |
| Group 2: | | |
| Milk | 0 | ¹ 8 |
| Eggs | 0 | ¹ 12 |
| Group 3: Flour (cake) | 0 | 12 |

¹ Stir together well.

METHOD

Have all ingredients at 75° F.

Weigh the ingredients of Group 1 into the 10-quart bowl of the bench Hobart Model C-10 mixer, mix at first speed for 30 seconds and scrape down the bowl. (NOTE.—This is a preliminary mixing period and is not included in the following mixing times.)

Cream 2 minutes at second speed and scrape down the bowl.

Cream 2 minutes at second speed, and again scrape down the bowl.

Cream at first speed for 1 minute, adding one-half of the ingredients of Group 2 during the first 20 seconds. Add the ingredients of Group 3 and cream 1 minute at first speed.

Cream 1 minute at first speed, adding the other one-half of the ingredients of Group 2 during the first 20 seconds.

Take specific gravity of the batter and scale 510 grams of the batter into a standard, paper-lined loaf pan. Bake 65 to 70 minutes at 360° F. Allow cake to cool to room temperature before measuring.

Report volume of finished cake and specific gravity of batter; also consistency and appearance of batter.

*Pound cake baking test (with monoglycerides)*

FORMULA

|  | Lbs. | Ozs. |
|---|---|---|
| Group 1: | | |
| Shortening material (containing monoglycerides) | 1 | 7 |
| Sugar, fine granulated | 2 | 7 |
| Salt | 0 | 1 |
| Flour (cake) | 2 | 0 |
| Group 2: | | |
| Milk | 1 | 0 |
| Vanilla | 0 | ½ |
| Group 3: Whole eggs | 1 | 7 |

METHOD

Have all ingredients at 75° F. Mix at first speed.

Scale the ingredients of Group 1 into the 10-quart Hobart C-10 mixer bowl in the order given. Scale the ingredients of Group 2 separately and pour into the bowl with the ingredients of Group 1, starting the machine immediately, very slowly, so that the liquid and dry ingredients pick up without splashing. Mix for one-half minute and scrape down the bowl and beater. Mix for 3 minutes, not including the one-half minute interval at the beginning. Scrape down again and continue mixing for an additional 3-minute interval. Scrape down.

Add one-third of the eggs (75° F.) and mix 1 minute. Stop the machine and add one-third of the eggs. Mix another minute, then stop the machine. Add the final portion of the eggs, scrape down well, and continue mixing for 2 minutes to bring the total mixing time to 10 minutes. Take the specific gravity.

Scale 510 grams of the batter into a regulation paper-lined loaf pound cake pan and bake at 360° F. for 70 minutes. The maximum allowable variation in baking time should not exceed 5 minutes, depending on the load of the oven. Remove from the pan immediately after baking. Allow to cool to room temperature before measuring in the volumemeter.

a. Report specific gravity reading at 10 minutes in grams per cc.

b. Report batter temperature.

c. Report the cake volume in cc.

d. In addition, report such observations as consistency of the batter, appearance of the top crust and grain and texture of the cake.

From the foregoing specific examples describing the characteristics and improved properties of crystal modified lard it will be very apparent to those skilled in the art that crystal modified lard is particularly useful in the preparation of improved shortening products. Thus, any shortening product which has heretofore consisted of a substantial proportion of animal triglyceride material, such as lard, will be provided with very substantially improved baking and storage properties as well as improved appearance, particularly after holding at moderate or elevated temperatures by substituting crystal modified lard for all or part of the unmodified lard in the shortening. The resulting shortening product has been found to have the desirable properties characteristic of an all vegetable shortening while retaining the superior shortening properties of lard. Further evidence of the fundamental alteration of the crystal structure of the lard toward that of a vegetable shortening is evident on observing that the X-ray diffraction pattern of the treated lard much more closely resembles the pattern of a hydrogenated cotton seed oil shortening than that of the original lard. The foregoing has been found to be true in all types of compounded animal fat and animal-vegetable shortenings where the said shortenings contain added animal or vegetable hard fats and monoglycerides or are hydrogenated. Significantly, the improved results obtained with crystal modified lard are in no way dependent upon the presence of monoglycerides since the desirable properties are enhanced by deodorization treatment.

While, as indicated above, crystal modified lard per se possesses excellent properties characteristic of an all vegetable shortening while still retaining the superior shortening properties of lard, it has also been found that crystal modified lard which has been hydrogenated, either after or prior to crystal modification, is an especially desirable shortening ingredient. Hydrogenated lard has heretofore been proposed for use in the manufacture of shortenings. However, such products have generally had a crinkly or grainy appearance, and have been brittle or otherwise unsatisfactory. Additionally, when such prior art hydrogenated lard shortenings have been filled into drums or the like, a wide variation in the consistency of the product in different portions of the container has existed. The outer portion of the shortening has generally been firm and somewhat brittle while the interior thereof has been grainy and semi-liquid. It has now been discovered that a greatly improved shortening results when crystal modified lard is substituted for the ordinary lard used therein. The modified lard is usually hydrogenated to a drop of about 5 to 20 units in iodine value and preferably to a drop of about 8 to 18 units. This partially-hydrogenated, crystal modified lard is then incorporated in the usual manner into a shortening. In general, three types of shortenings containing this partially-hydrogenated, crystal modified lard have been found to possess very desirable properties. These are: a shortening containing predominently partially-hydrogenated, crystal modified lard plus 3 per cent to 8 per cent hard fat; a shortening containing about 50 per cent partially hydrogenated, crystal modified lard plus about 50 per cent regular lard and hard fat; and a shortening containing varying percentages of partially-hydrogenated, crystal modified lard plus either vegetable fat or hydrogenated vegetable fat or both. These shortenings may, of course, contain other ingredients such as mono- and diglycerides in conventional amounts if desired. As the hard fat, it is preferred to use hydrogenated cottonseed oil, although hydrogenated soy bean oil may also be used. This hard fat is approximately fully hydrogenated, or hydrogenated to about 50–60 titer, and is used in percentages ranging from trace amounts to 15 per cent, and preferably from about 3 per cent to 12 per cent by weight of the total shortening. The following specific examples show the formulation of shortening products containing the partially-hydrogenated, crystal modified lard, but are furnished for the purpose of illustration only and are not to be construed as placing any limitation on the scope of the present invention:

EXAMPLE XXIX

A crystal modified lard, produced by treatment with stannous hydroxide in a manner similar to that illustrated in Examples V and VI, was hydrogenated sufficiently to drop its iodine value 10 units. This partially-hydrogenated, crystal modified lard was then mixed with 6 per cent of fully hydrogenated soy bean oil, and the mixture deodorized, filled and tempered in the usual manner known to the shortening art. A similar product was made using unmodified lard as a control. The control shortening exhibited the undesirable properties of normal hydrogenated lard shortenings, whereas the shortening containing the partially-hydrogenated, crystal modified lard was smooth, had good body and texture, and an acceptable consistency throughout the entire batch. The pound cake bake test, carried out in the manner heretofore described, indicated that the shortening made from the partially-hydrogenated, modified lard produced a very acceptable pound cake whereas that made from the unmodified control lard produced a very unsatisfactory pound cake.

EXAMPLE XXX

A mixture of 50 per cent ordinary prime steam lard and 50 per cent crystal modified lard was hydrogenated to an iodine value drop of 10 units. This material was then processed, in the ordinary manner, into a finished shortening. For a control, a similar shortening was manufactured from hydrogenated unmodified lard. The control shortening exhibited a crinkly texture and a crust on the surface of the drum with a soft interior having a tendency towards graininess. The shortening containing the mixture of hydrogenated lard and hydrogenated modified lard, on the other hand, was creamy in appearance and has good body throughout the entire cross-section of the drum.

While the foregoing examples have illustrated the formulation of a shortening from a crystal modified lard which has been hydrogenated after crystal modification, it is to be understood that the hydrogenation may be successfully carried out prior to crystal modification of the lard. The shortenings produced in this manner have been found to possess exceptionally good properties both as to appearance and also as to actual performance.

It should thus be apparent that the improved lard obtained in accordance with the invention described herein can be used as an all-purpose shortening in place of both the animal and vegetable shortenings heretofore discriminately employed because of their peculiar properties. The improved lard may thus be advantageously employed in the manufacture of cakes and icings as well as in the preparation of bread and pie crust. Although we have illustrated the invention as being particularly applicable to baked goods, it is also applicable to other food products, such as the manufacture of candy and fried products. It is also understood that the improved fat may be advantageously used in lubricants, greases, cosmetics, medicated ointments, and in many other industrial applications.

When employing the herein-disclosed polyvalent metallic salt catalysts other than the tin salts, the problem of decolorizing the crystal modified lard is often quite serious. For this reason applicants prefer to employ the salts, such as stannous chloride or stannous hydroxide, when treating lard of an edible grade. In many instances, however, complete decolorization is not required and in these instances it is possible to employ any of the polyvalent metallic salt crystal modifying catalysts.

This application is a continuation-in-part application of U. S. patent application Serial No. 183,666 filed September 7, 1950, now Patent No. 2,625,478 which is a continuation-in-part of U. S. patent application Serial No. 724,468, filed January 25, 1947.

Obviously, many modifications and variations of the invention as hereinbefore set forth may be made without departing from the spirit and scope thereof, and therefore only such limitations should be imposed as are indicated in the appended claims.

We claim:

1. The process of treating a lard to permanently modify the crystallization properties and improve the appearance and keeping qualities thereof, which comprises: subjecting lard to a heat treatment at a temperature between about 120° C. and 260° C. for a period of between about one-half and six hours in the presence of a gas at substantial superatmospheric pressure and a small amount of an interesterification catalyst to permanently modify the crystallization properties of the lard without causing a significant amount of interesterification.

2. The process of claim 1 in which the treatment is continued until the crystallization properties of the lard are substantially completely modified.

3. In a process of treating lard, the steps which comprise contacting the lard with an interesterification catalyst; and subjecting said lard while in liquid phase and in contact with said catalyst to a heat treatment at a temperature between about 120° C. and 260° C. for a period of between about one-half and six hours in the presence of a gas at substantial superatmospheric pressure whereby to produce a lard in which the solid constituents of said lard crystallize in a stable form having an X-ray diffraction pattern resembling that of hydrogenated cottonseed oil shortening and differing substantially from that of unmodified lard.

References Cited in the file of this patent

UNITED STATES PATENTS

| | | |
|---|---|---|
| 2,442,531 | Eckey | June 1, 1948 |
| 2,625,478 | Mattil et al. | Jan. 13, 1953 |

OTHER REFERENCES

"Industrial Oil and Fat Products," by Alton E. Bailey, Interscience Publishers, Inc., New York, New York, 1945, pages 614–618 and 679.